(12) United States Patent
Schneider et al.

(10) Patent No.: US 10,300,781 B2
(45) Date of Patent: May 28, 2019

(54) DRIVETRAIN FOR A HYBRID VEHICLE

(71) Applicant: BorgWarner Inc., Auburn Hills, MI (US)

(72) Inventors: Florian Schneider, Heilbad Heiligenstadt (DE); Viren Saxena, Mannheim (DE); Hans Juergen Hauck, Schwaebisch Hall (DE); Alexander Moser, Ketsch (DE); Rolf Koestel, Bruchsal (DE)

(73) Assignee: BorgWarner Inc., Auburn Hills, MI (US)

( * ) Notice: Subject to any disclaimer, the term of this patent is extended or adjusted under 35 U.S.C. 154(b) by 5 days.

(21) Appl. No.: 15/564,777

(22) PCT Filed: Apr. 12, 2016

(86) PCT No.: PCT/US2016/027026
§ 371 (c)(1),
(2) Date: Oct. 6, 2017

(87) PCT Pub. No.: WO2016/168144
PCT Pub. Date: Oct. 20, 2016

(65) Prior Publication Data
US 2018/0111472 A1    Apr. 26, 2018

(30) Foreign Application Priority Data

Apr. 14, 2015  (DE) .......................... 10 2015 004 572
Mar. 10, 2016  (DE) .......................... 10 2016 002 908

(51) Int. Cl.
*B60K 6/547* (2007.10)
*B60K 6/383* (2007.10)
(Continued)

(52) U.S. Cl.
CPC ............... *B60K 6/547* (2013.01); *B60K 6/36* (2013.01); *B60K 6/383* (2013.01); *B60K 6/40* (2013.01);
(Continued)

(58) Field of Classification Search
None
See application file for complete search history.

(56) References Cited

U.S. PATENT DOCUMENTS 8,337,171 B2 * 12/2012 Agner ..................... B60K 6/36
                                                    192/48.92
2007/0289833 A1    12/2007 Chapelon et al.
(Continued)

FOREIGN PATENT DOCUMENTS

DE            102012006730 A1    10/2013

OTHER PUBLICATIONS

International Search Report and Written Opinion of the International Searching Authority for PCT International Application No. PCT/US2016/027026 dated Jul. 19, 2016.

*Primary Examiner* — Paul N Dickson
*Assistant Examiner* — Hilary L Johns
(74) *Attorney, Agent, or Firm* — Howard & Howard Attorneys PLLC

(57) ABSTRACT

A drivetrain for a hybrid vehicle comprising an electric machine and a double clutch device (which has an input side assigned to a drive unit, a first clutch arrangement assigned to a first transmission input shaft of a transmission for selective torque transmission between the drive unit and the first transmission input shaft, and a second clutch arrangement assigned to a second transmission input shaft of the transmission for selective torque transmission between the drive unit and the second transmission input shaft, wherein the first clutch arrangement has a first clutch input side
(Continued)

which interacts with the electric machine, and the second clutch arrangement has a second clutch input side, wherein the first clutch input side of the first clutch arrangement is connected to the input side of the double clutch device via a freewheel or to the second clutch input side of the second clutch arrangement.

14 Claims, 5 Drawing Sheets

(51) Int. Cl.
*B60K 6/48* (2007.10)
*B60K 6/36* (2007.10)
*F16H 3/00* (2006.01)
*B60K 6/40* (2007.10)
*B60K 6/44* (2007.10)

(52) U.S. Cl.
CPC ............... *B60K 6/48* (2013.01); *F16H 3/006* (2013.01); *B60K 6/44* (2013.01); *B60K 2006/4825* (2013.01); *B60Y 2200/92* (2013.01); *B60Y 2300/424* (2013.01); *Y02T 10/6221* (2013.01); *Y02T 10/6252* (2013.01); *Y10S 903/909* (2013.01); *Y10S 903/913* (2013.01); *Y10S 903/919* (2013.01)

(56) References Cited

U.S. PATENT DOCUMENTS

| | | |
|---|---|---|
| 2008/0000746 A1 | 1/2008 | Schiele et al. |
| 2013/0066530 A1 | 3/2013 | Holzer et al. |
| 2015/0083546 A1* | 3/2015 | Moser .................... B60K 6/383 |
| | | 192/41 R |

* cited by examiner

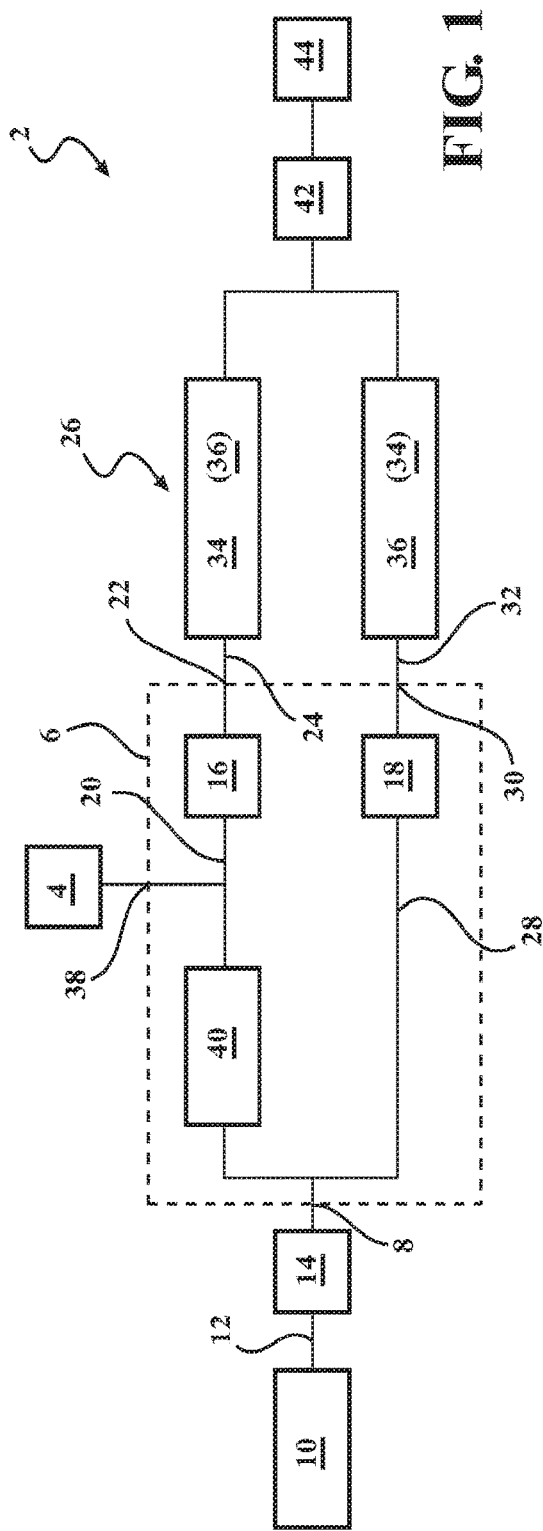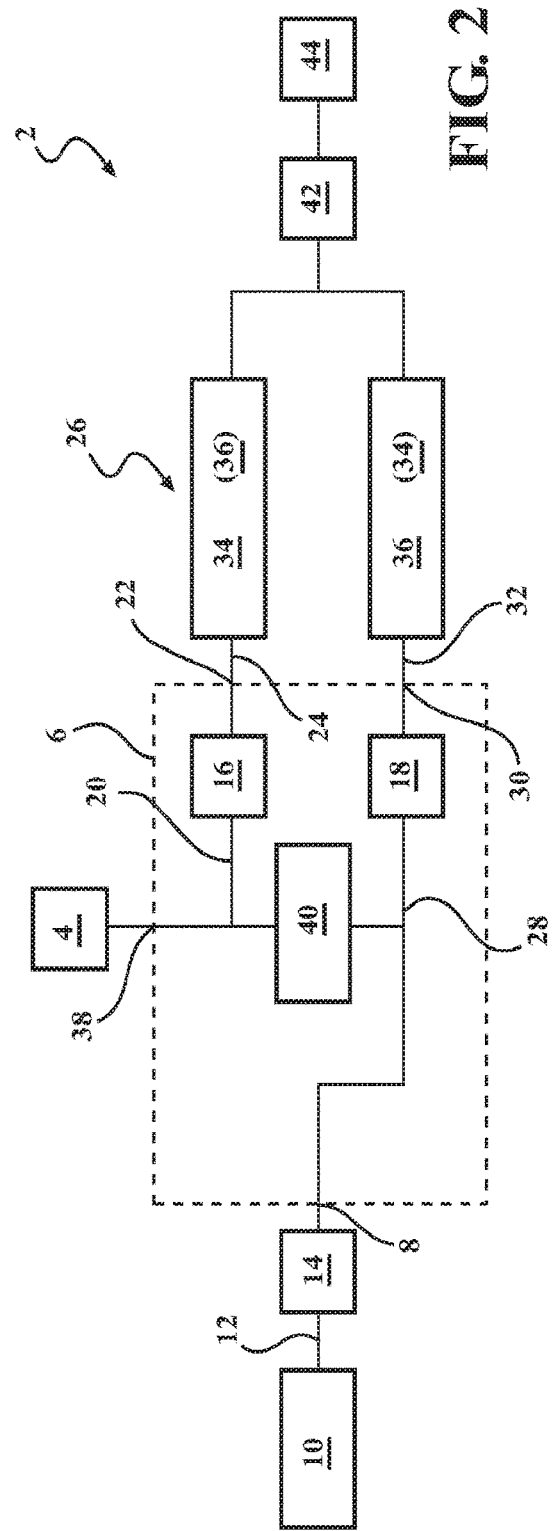

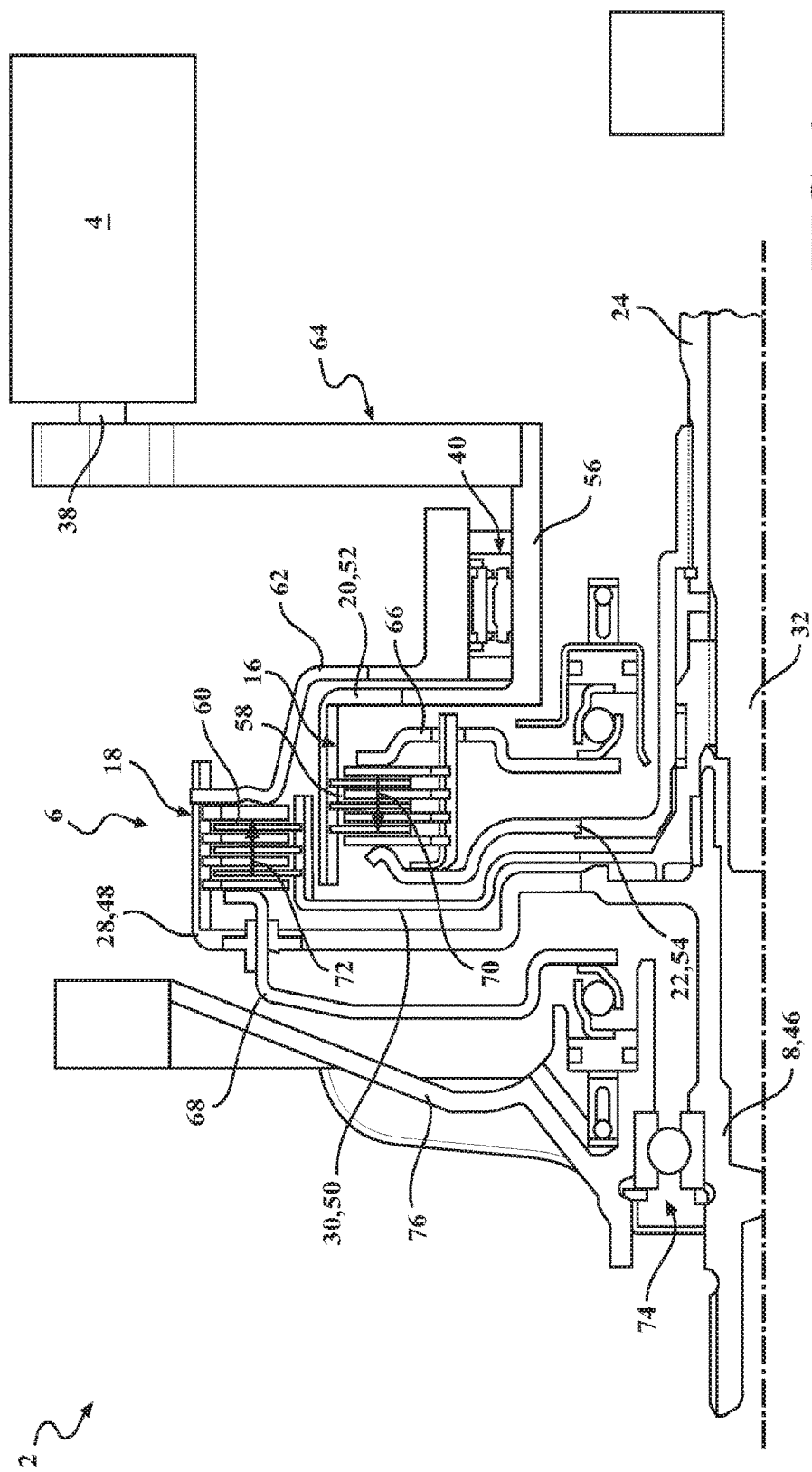

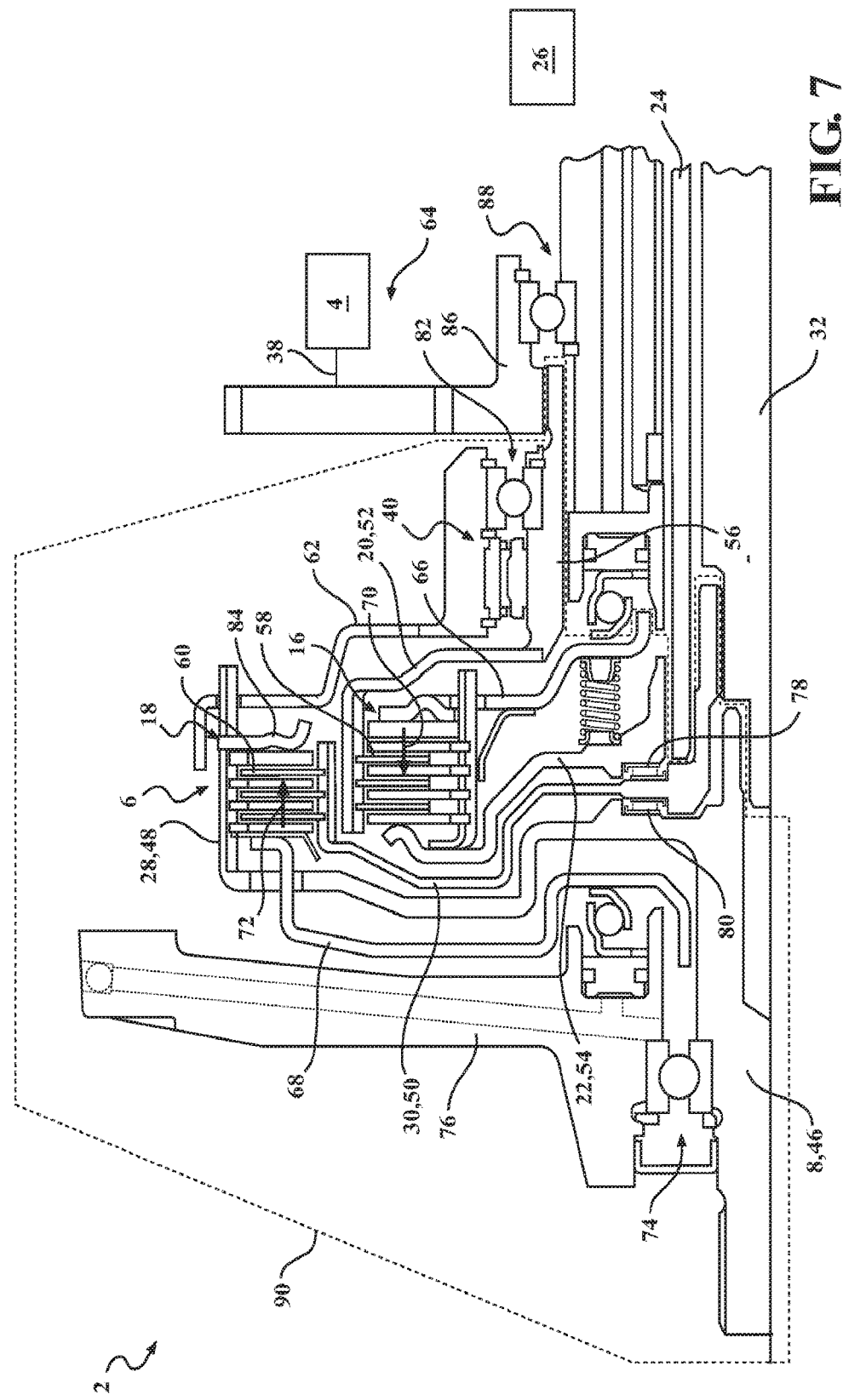

DRIVETRAIN FOR A HYBRID VEHICLE

CROSS REFERENCE TO RELATED APPLICATIONS

This application is a National Phase of International Patent Application No. PCT/US2016/027026 filed on Apr. 12, 2016, which claims priority to and all the benefits of German Patent Application No. 102015004572.5 filed on Apr. 14, 2015 and German Patent Application No. 102016002908.0 filed on Mar. 10, 2016, both of which are hereby expressly incorporated herein by reference in their entirety.

BACKGROUND OF THE INVENTION

1. Field of the Invention

The present invention relates to a drivetrain for a hybrid vehicle.

2. Description of the Related Art

A drivetrain for a hybrid vehicle is known from DE 10 2012 006 730 A1, wherein the drivetrain has an electric machine and a double clutch device. The double clutch device has an input side assigned to the drive unit or connectable to an output side of a drive unit, for example, an internal combustion engine. In addition, the double clutch device has a first clutch arrangement assigned to a first transmission input shaft of a transmission for selective torque transmission between the drive unit and the first transmission input shaft and a second clutch arrangement assigned to a second transmission input shaft of the transmission for selective torque transmission between the drive unit and the second transmission input shaft. The first clutch arrangement thereby has a first clutch input side, which interacts with the electric machine, while the second clutch arrangement has a second clutch input side, wherein the first clutch input side and the second clutch input side are united in the common input side of the double clutch device. In the known double clutch device, the first clutch input side is essentially formed by a first disk support section, while the second clutch input side is formed by a second disk support section, which are arranged on a common outer disk support. The input side of the double clutch device is essentially formed by a clutch input hub and a torque transmission element, in the form of a drive plate, connected to the clutch input hub. In order to be able to omit an expensive additional clutch arrangement, for example, in the form of an additional disk clutch or similar, a free wheel in the form of the drive disk is arranged in the input side of the double clutch device, more precisely stated, between the clutch input hub and the torque transmission element, so that a clutch device is created which saves installation space and weight, and in which the switching to or the separation from the electric machine is simplified.

The known drivetrain has proven itself; however, since the freewheel is connected in the input side of the double clutch device and thus both before the first and the second clutch arrangement, a braking by the drive unit, the so-called engine braking, is not possible when the vehicle slows or rolls downhill. Braking is also limited due to the energy recovery by the electric machine, both due to the battery size and also due to the charge state of the battery. If the battery is, for example, completely charged, then a braking torque would have to be generated completely by mechanical braking, as a braking based on energy recovery by the electric machine may no longer take place.

SUMMARY OF THE INVENTION

It is therefore an object of the present invention to create a drivetrain for a hybrid vehicle comprising an electric machine and a double clutch device, which has a simple and compact construction and a simple operability and a low drag torque, and also overcomes the previously mentioned disadvantages of the prior art.

The drivetrain according to the invention is conceived of for a hybrid vehicle and has an electric machine and a double clutch device. The double clutch device has an input side facing a drive unit, for example, an internal combustion engine. The input side of the double clutch device is hereby preferably designed as an input hub, if necessary, with a torque transmission element in the form of a drive plate. Furthermore, the double clutch device has a first clutch arrangement assigned to a first transmission input shaft of a transmission for selective torque transmission between the drive unit and the first transmission input shaft, and a second clutch arrangement assigned to a second transmission input shaft of the transmission for selective torque transmission between the drive unit and the second transmission input shaft. In the clutch arrangements of the double clutch device listed herein, this is preferably a disk clutch, particularly preferably a wet-running disk clutch in which the disks run in a coolant and/or a lubricating medium, for example, oil. It is also preferred if the two clutch arrangements of the double clutch device are hydraulically actuatable. The first clutch arrangement has a first clutch input side which, for example, may likewise be formed by a disk carrier, while the second clutch arrangement has a second clutch input side, which may likewise be formed, for example, by a disk carrier. The first clutch input side thereby interacts with the electric machine so that, for example, a rotational movement of the first clutch input side may be transmitted to the electric machine or vice versa. The electric machine itself may preferably be operated selectively as a generator or as an engine. The first clutch input side of the first clutch arrangement is connected via a freewheel to the input side of the double clutch device. Alternatively, the first clutch input side of the first clutch arrangement may be connected via a freewheel to the second clutch input side of the second clutch arrangement. As the first clutch input side of the first clutch arrangement is connected via the freewheel to the input side of the double clutch device, while the freewheel does not function between the input side of the double clutch device and the second clutch input side of the second clutch arrangement, the previously mentioned engine braking in a slowing hybrid vehicle or a hybrid vehicle rolling down hill is possible with the drivetrain according to the invention, if the second clutch arrangement is closed and the first clutch arrangement is open. This applies correspondingly for the second listed alternative, in which the first clutch input side of the first clutch arrangement is connected via a freewheel to the second clutch input side of the second clutch arrangement so that the freewheel interacts between the input side of the clutch device and the second clutch input side of the second clutch arrangement, not, however, between the input side of the double clutch device and the first clutch input side of the first clutch arrangement, wherein engine braking is possible in this case in a slowing hybrid vehicle or a hybrid vehicle rolling downhill when the first clutch is closed. Moreover, the advantages of the drivetrain known from DE 10 2012 006 730 A1 are retained, in that a simple and compact construction, a simple operability due to the omission of the expensive actuation system, and a low drag torque are achieved, wherein the latter may be attributed to the substitution of the freewheel for another clutch arrangement.

In one preferred embodiment of the drivetrain according to the invention, the first or second transmission input shaft is assigned to the odd gears, if necessary, to the reverse gear, of the transmission, while the second or first transmission input shaft, thus the other transmission input shaft, is assigned to the even gears, if necessary, also the reverse gear, of the transmission. In the possible embodiment variants identified here, one has proven to be particularly advantages, in which the first transmission input shaft is assigned to the reverse gear of the transmission in order to enable a pure electric driving of the hybrid vehicle via the first clutch input side operatively connected to the electric machine in both one of the forward gears and also in the reverse gear, without necessitating a reversal of the direction of rotation for the electric machine.

In another preferred embodiment of the drivetrain according to the invention, the first and the second clutch arrangements are arranged concentrically or radially nested, thus the double clutch device requires only a low axial installation space.

In one alternative embodiment to the previously described embodiments, the first and the second clutch arrangements are arranged in parallel or axially staggered in an advantageous embodiment of the drivetrain according to the invention. In this way, radial installation space required for the double clutch device may be reduced.

To reduce the axial installation space of the drivetrain in the region of the, for example, concentric or parallel double clutch device, the electric machine is arranged radially nested with the first and/or second clutch arrangement of the double clutch device.

To reduce the radial installation space requirements of the drivetrain in the region of the, for example, concentric or parallel double clutch device, the electric machine in another advantageous embodiment of the drivetrain according to the invention is arranged axially staggered with the first and/or second clutch arrangement, wherein a parallel arrangement of the electric machine may also be discussed in this case with respect to the first and/or second clutch arrangement. In this embodiment, it is moreover preferred, if the electric machine is arranged between the first and second clutch arrangement in the axial direction, wherein a parallel double clutch device is particularly preferred in this case.

In another preferred embodiment of the drivetrain according to the invention, a torsional vibration damper is provided between the input side of the double clutch device and an output side of the drive unit to intercept any torque shocks on the side of the drive unit so that these are not transferred, or are transferred only in a weakened fashion to the clutch arrangements or to the freewheel of the drivetrain.

In another advantageous embodiment of the drivetrain according to the invention, the second clutch input side of the second clutch arrangement is in rotational driving connection with the input side of the double clutch device, continuously and/or in both of the two opposing rotational directions of the input side of the double clutch device, so that the freewheel only functions between the input side of the double clutch device and the first clutch input side of the first clutch arrangement, not, however, between the second input side of the second clutch arrangement and the input side of the double clutch device. In this embodiment, it is moreover preferred if no freewheel is provided between the second clutch input side of the second clutch arrangement and the input side of the double clutch device.

In another advantageous embodiment of the drivetrain according to the invention, a first actuating force which is exerted or is exertable on the first clutch arrangement and a second actuating force which is exerted or is exertable on the second clutch arrangement via a common bearing, preferably roller bearing, of the double clutch device, which bearing is supported or is supportable preferably in the axial direction on a fixed housing. It is thereby further preferred if the first and second actuating forces are set opposite one another and/or the first and second clutch arrangement are hydraulically actuatable.

To enable a simple assembly and disassembly of the drivetrain, the double clutch device together with the input side, the first clutch arrangement, the first clutch input side, the second clutch arrangement and the second clutch input side, and the freewheel form a module in another preferred embodiment of the drivetrain according to the invention, which module is coherently connected or is connectable, preferably coherently secured against loss, to the electric machine and to the transmission. The module is thereby preferably pluggably connected or is pluggably connectable in the axial direction to the electric machine on the one side and the transmission on the other.

In another advantageous embodiment of the drivetrain according to the invention, the previously mentioned module additionally has a housing section or housing cover, for example, a transmission housing cover, and a bearing arranged between the input side of the double clutch device and the housing section or cover. The bearing mentioned herein is preferably a roller bearing, wherein it is particularly preferred if the bearing arranged between the input side of the double clutch device and the housing section or cover forms the previously mentioned common bearing, via which the first and second actuating forces are supported or are supportable on the fixed housing, in this case, the housing section or cover.

The invention will be subsequently described in greater detail by means of exemplary embodiments with reference to the attached figures.

BRIEF DESCRIPTION OF THE DRAWINGS

Other advantages of the invention will be readily appreciated as the same becomes better understood by reference to the following detailed description when considered in connection with the accompanying drawings, wherein:

FIG. 1 shows a schematic representation of a first embodiment of the drivetrain according to the invention.

FIG. 2 shows a schematic representation of a second embodiment of the drivetrain according to the invention.

FIG. 6 shows a side view of a first embodiment variant of the drivetrain according to the invention in the region of the double clutch device in a sectional view.

FIG. 7 shows a side view of a second embodiment variant of the drivetrain according to the invention in the region of the double clutch device in a sectional view.

DETAILED DESCRIPTION OF THE INVENTION

Figure 3:
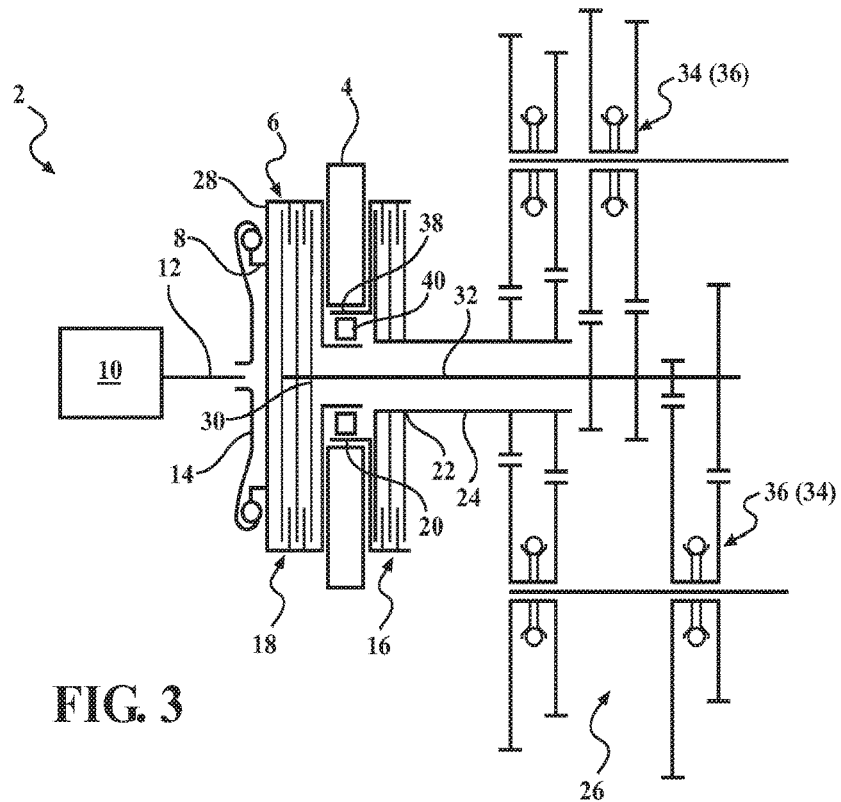
FIG. 3 shows a schematic representation of a third embodiment of the drivetrain according to the invention.

FIG. 1 shows a first embodiment of a drivetrain 2 for a hybrid vehicle. Drivetrain 2 has an electric machine 4 which may be operated both as a generator and as an engine. In addition, drivetrain 2 has a double clutch device 6. Double clutch device 6 has an input side 8 which is assigned to a drive unit 10 in the form of an internal combustion engine. Stated more precisely, an output side 12 of drive unit 10 is in rotational driving connection with input side 8 of double clutch device 6, wherein the rotational driving connection is carried out in this case indirectly via torsional vibration damper 14 which is arranged between input side 8 of double clutch device 6 and output side 12 of drive unit 10.

Double clutch device 6 has a first clutch arrangement 16 and a second clutch arrangement 18 which are formed preferably as disk clutches, particularly preferred as wet-running disk clutches. First clutch arrangement 16 has a first clutch input side 20 and a first clutch output side 22, wherein first clutch output side 22 is in rotational driving connection with a first transmission input shaft 24 of a transmission 26. Consequently, first clutch arrangement 16 is assigned to first transmission input shaft 24 of transmission 26 to selectively effect a torque transmission between drive unit 10 and first transmission input shaft 24 of transmission 26. Correspondingly, second clutch arrangement 18 has a second clutch input side 28 and a second clutch output side 30, wherein the latter is in rotational driving connection with a second transmission input shaft 32 of transmission 26. Consequently, second clutch arrangement 18 is assigned to second transmission input shaft 32 of transmission 26 in such a way that a torque is selectively transmittable between drive unit 10 and second transmission input shaft 32.

First transmission input shaft 24 is assigned to the odd gears 34, in necessary, also to the reverse gear, of transmission 26, whereas second transmission input shaft 32 is assigned to the even gears 36, if necessary, also to the reverse gear, of transmission 26. It is hereby preferred if first transmission input shaft 24 is also assigned to the reverse gear to guarantee a purely electric driving of the hybrid vehicle in forward and reverse directions without necessitating a reversal of the direction of rotation of electric machine 4 which is described subsequently in greater detail.

Electric machine 4 has an output side 38 which interacts with first clutch input side 20 of first clutch arrangement 16 or is in rotational driving connection with the same, wherein the rotational driving connection may be effected, for example, via toothed gears or a traction drive, for example, a belt or chain drive. A freewheel 40 is arranged between first clutch input side 20 of first clutch arrangement 16 and input side 8 of double clutch device 6 so that first clutch input side 20 of first clutch arrangement 16 is connected to input side 8 of double clutch device 6 via freewheel 40. Whereas freewheel 40 thus functions between input side 8 of double clutch device 6 and first clutch input side 20 of first clutch arrangement 16, second clutch input side 28 of second clutch arrangement 18 is continuously in rotational driving connection with input side 8 of double clutch device 6. Second clutch input side 28 of second clutch arrangement 18 is thereby in rotational driving connection with input side 8 of double clutch device 6 in both of the two opposing rotational directions of input side 8 of double clutch device 6. Thus, no freewheel is provided, in particular, between second clutch input side 28 of second clutch arrangement 18 and input side 8 of double clutch device 6.

On the output side, transmission 26, which is a double clutch transmission, interacts with the wheels 44 of the hybrid vehicle via a further transmission 42.

Alternatively to the embodiment according to FIG. 1, first transmission input shaft 24 might also be assigned to even gears 36, whereas second transmission input shaft 32 might be assigned to odd gears 34 of transmission 26, as this is indicated in FIG. 1 by means of the corresponding reference numerals in parentheses. In this case, it is again preferred if the reverse gear is also assigned to first transmission input shaft 24.

FIG. 2 shows a second embodiment of drivetrain 2 which corresponds substantially to drivetrain 2 of FIG. 1, so that subsequently only the differences will be introduced; identical reference numerals are used for identical or similar parts and the preceding description correspondingly applies in general.

As is clear from FIG. 2, first clutch input side 20 of first clutch arrangement 16 in the second embodiment is connected to second clutch input side 28 via a freewheel 40 so that first clutch input side 20 of first clutch arrangement 16, via freewheel 40, and second clutch input side 28 of second clutch arrangement 18 are, if necessary, in rotational driving connection with input side 8 of double clutch device 6, whereas second clutch input side 28 is furthermore in continuous rotational driving connection with input side 8 of double clutch device 6 without an intermediary acting freewheel 40, as this has already been previously explained. In general, the preceding embodiments correspondingly apply.

FIG. 3 shows a third embodiment of drivetrain 2 which corresponds substantially to drivetrain 2 of FIG. 2, so that subsequently only the differences will be introduced; identical reference numerals are used for identical or similar parts and the preceding description correspondingly applies in general.

As is clear in FIG. 3, first and second clutch arrangements 16, 18 are arranged in parallel or axially staggered, wherein the two clutch arrangements 16, 18 of double clutch device 6—as already previously mentioned—are designed as disk clutches. It is also clear in FIG. 3 that electric machine 4 is arranged axially staggered with first and second clutch arrangements 16, 18, wherein electric machine 4 is arranged between first and second clutch arrangements 16, 18 in the axial direction. In general, the preceding embodiments correspondingly apply for the embodiment according to FIG. 3.

Figure 4:
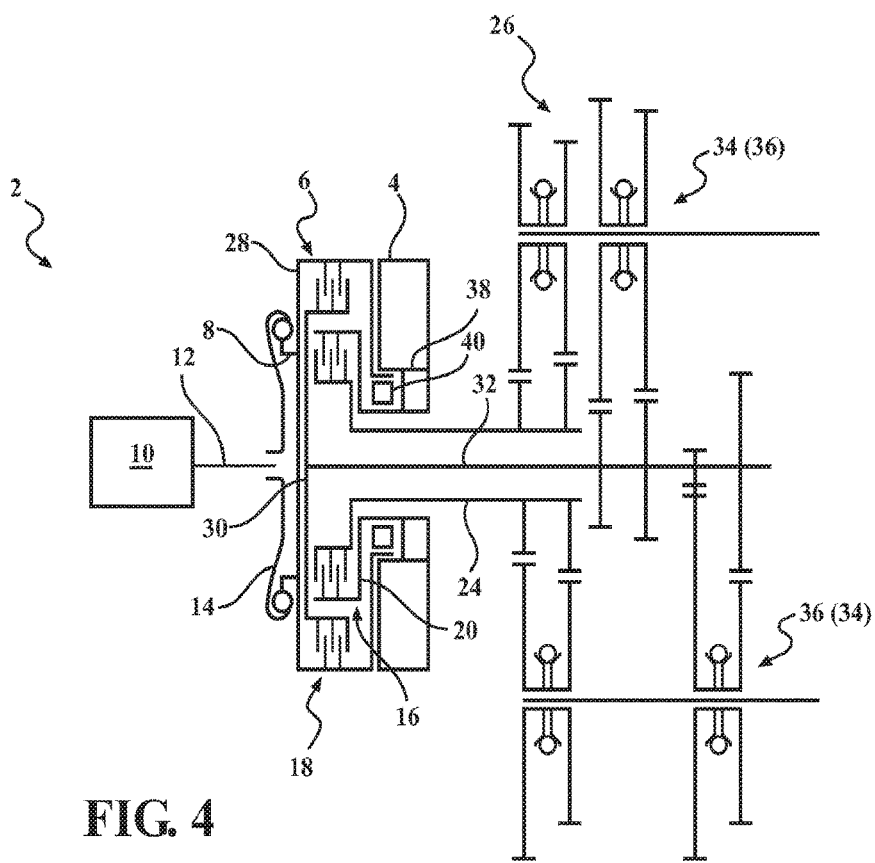
FIG. 4 shows a schematic representation of a fourth embodiment of the drivetrain according to the invention.

FIG. 4 shows a fourth embodiment of drivetrain 2, wherein drivetrain 2 corresponds substantially to the embodiment according to FIGS. 2 and 3, so that subsequently only the differences will be introduced; identical reference numerals are used for identical or similar parts and the preceding description correspondingly applies in general.

As is clear in FIG. 4, first and second clutch arrangements 16, 18 are arranged concentrically or radially nested in the fourth embodiment, so that an inner clutch 16 may also be discussed which is arranged radially inside of outer clutch 18 and is thereby arranged with the same in a radially nested configuration. Electric machine 4 is again arranged axially staggered with first clutch arrangement 16 or second clutch arrangement 18, wherein electric machine 4 in the embodiment shown is arranged axially staggered with both first clutch arrangement 16 and also with second clutch arrangement 18. In general, the preceding description correspondingly applies.

Even if not shown in FIGS. 3 and 4, electric machine 4 might alternatively be arranged radially nested with first and/or second clutch arrangement 16, 18, if a shorter axial installation space is specified for double clutch device 6.

Figure 5:
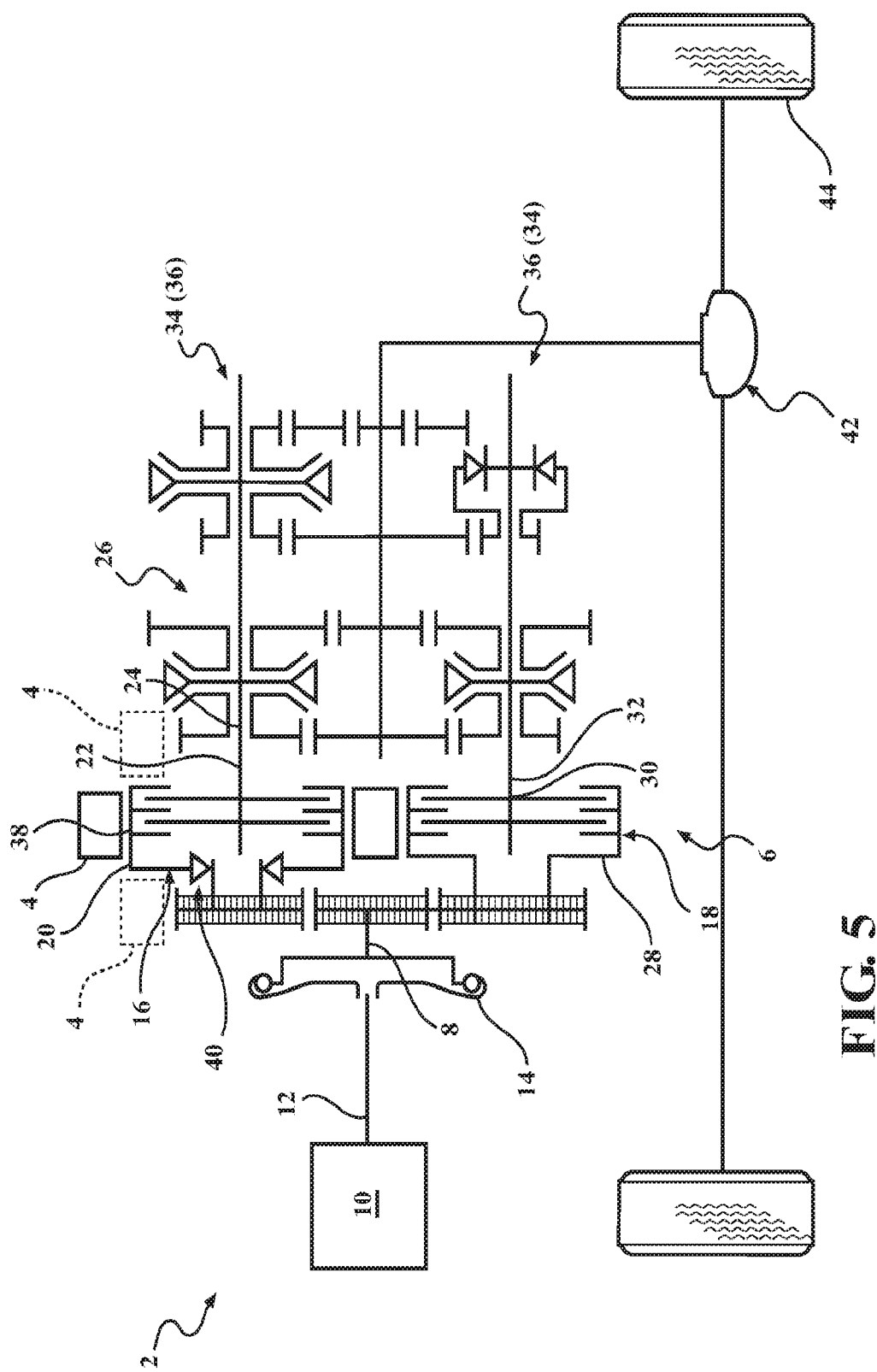
FIG. 5 shows a schematic representation of a fifth embodiment of the drivetrain according to the invention.

FIG. 5 shows a fifth embodiment of drivetrain 2, wherein the fifth embodiment corresponds substantially to the embodiment according to FIG. 1, so that subsequently only the differences will be introduced; identical reference numerals are used for identical or similar parts and the preceding description correspondingly applies in general.

As is clear in FIG. 5, electric machine 4 is arranged in the embodiment according to FIG. 5 in a radially nested configuration with first clutch arrangement 16. If the installation space available in the radial direction should, however, prove to be too small, then electric machine 4 may be alternatively arranged axially staggered with first clutch arrangement 16, as this is indicated in FIG. 5 by electric machine 4 shown with dashed lines.

FIG. 6 shows a concretized embodiment variant of double clutch device 6 in conjunction with electric machine 4, which might be used in a drivetrain 2, wherein the embodiment variant shown corresponds substantially to the embodiments according to FIGS. 2 and 4 so that the preceding description of the cited embodiments correspondingly applies and identical reference numerals are used for identical or similar parts.

As is clear in FIG. 1, input side 8 of double clutch device 6 is formed by input hub 46, on which a disk carrier 48, in this case an outer disk carrier 48, is mounted rotationally fixed, wherein disk carrier 48 forms second clutch input side 28 of second clutch arrangement 18 designed as a radially outer clutch arrangement. In addition, a disk carrier 50, in this case an inner disk carrier 50, forms second clutch output side 30 and is assigned to second clutch arrangement 18. First clutch arrangement 16 also has a disk carrier 52 designed as an outer disk carrier and a disk carrier 54 designed as an inner disk carrier, wherein disk carrier 52 with the hub 56 thereof forms first clutch output side 22 of first clutch arrangement 16. Both clutch arrangements 16, 18 also have a disk pack 58, 60.

A torque transmission element 62 is mounted rotationally fixed, preferably also detachably, on disk carrier 48, wherein freewheel 40 is arranged between torque transmission element 62 and hub 56 of disk carrier 52 forming first clutch input side 20. Output side 38 of electric machine 4 is also in rotational driving connection with disk carrier 52 forming first clutch input side 20, more precisely stated with hub 56 of disk carrier 52, wherein this is effected in the present case by a traction drive 64 by way of example. Disk pack 60 of second clutch arrangement 18 is also supportable in the axial direction on torque transmission element 62.

An actuating element 66, 68 is assigned to both clutch arrangements 16, 18 or disk packs 58, 60 of the same, which actuating element may also be designated as a force transmission element and the respective disk pack 58, 60 may be pressed together by the same. In this way, both first and also second clutch arrangement 16, 18 are hydraulically actuatable, as this is clear by use of the actuating piston assigned to actuating elements 66, 68. In this way, actuating element 66 may exert a first actuating force 70 on first clutch arrangement 16, whereas actuating element 68 may exert a second actuating force 72 on second clutch arrangement 18, wherein both actuating forces 70, 72 are set opposite one another in the axial direction.

If first actuating force 70 is exerted on first clutch arrangement 16, then said actuating force 70 may be supported in the axial direction on first transmission input shaft 24 via disk carrier 54 forming first clutch output side 22. If, in contrast, second actuating force 72 is exerted on second clutch arrangement 18, then this may be supported in the axial direction on a housing section or cover 76 of a fixed housing via torque transmission element 62, via disk carrier 48 forming second clutch input side 28, via input hub 46 forming input side 8 of double clutch device 6, and via a bearing 74, which is designed as a roller bearing. Housing section/cover 76 may be, for example, a transmission housing cover which preferably also accommodates the actuating piston for actuating the actuating element 68.

FIG. 7 shows an alternative embodiment variant to the embodiment variant according to FIG. 6, wherein subsequently only the differences will be introduced; identical reference numerals are used for identical or similar parts and the preceding description correspondingly applies in general.

In the second embodiment variant, first and second actuating forces 70, 72 are also set opposite to one another. However, in the second embodiment variant, first actuating force 70 is also supported or is supportable on housing section/cover 76 of a fixed housing which is not shown in greater detail. Stated more precisely, actuating force 70 is supported or is supportable in the axial direction on housing section/cover 76 via disk carrier 54 forming first clutch output side 22, via axial bearing 78, via disk carrier 50 forming second clutch output side 30, via another axial bearing 80, via input hub 46 forming input side 8 of double clutch device 6, and via previously mentioned bearing 74.

In addition, not only free wheel 40 is provided between torque transmission element 62 and hub 56 of disk carrier 52 forming first clutch input side 20, but instead another bearing 82 is also provided, which is preferably designed as a roller bearing. Bearing 82 hereby functions to unload freewheel 40 during application of second actuating force 72 on second clutch arrangement 18, the more so as a spacing in the radial direction remaining largely the same between the inner and outer race of freewheel 40 is ensured by bearing 82. The latter results in that freewheel 40 or the components thereof are subjected to lower wear.

In addition, it is clear from FIG. 7 that disk pack 60 of second clutch arrangement 18 is not directly supportable in the axial direction on torque transmission element 62; instead, the axial support is carried out via a support element 84 on which disk pack 60 is axially supportable at a distance from torque transmission element 62. This also leads to an unloading of freewheel 40.

Furthermore, it is clear from FIG. 7 that a rotatable intermediate element 86 is provided, which is connected rotatably fixed, yet detachably, to disk carrier 52 forming first clutch input side 20, more precisely stated, to hub 56 thereof. Intermediate element 86 is thereby rotatably supported on a fixed housing, for example, the transmission housing, by a bearing 88, in this case a roller bearing. Intermediate element 86 may be designed, for example, as a wheel interacting with traction drive 64. Also, deviating from FIG. 6, electric machine 4 or output side 38 thereof may be in direct rotational driving connection with intermediate element 86. In the embodiment shown, for example, a transmission of the torque is effected in this case by use of toothed gears engaging with one another.

In the embodiments according to FIGS. 6 and 7, double clutch device 6 and freewheel 40 form a module 90 which is coherently connected or is connectable, preferably coherently secured against loss, particularly preferably pluggably connected or is pluggably connectable in the axial direction, to electric machine 4 and transmission 26. Stated more precisely, double clutch device 6, together with input hub 46, first clutch arrangement 16, first clutch input side 20 in the form of disk carrier 52, first clutch output side 22 in the form of disk carrier 54, second clutch arrangement 18, second clutch input side 28 in the form of disk carrier 48, second clutch output side 30 in the form of disk carrier 50 and torque transmission element 62, and freewheel 40 form a corresponding module 90. In this case, it is additionally preferred if module 90 additionally has the previously mentioned housing section/cover 76 and bearing 74 arranged between input side 8 of double clutch device 6 and housing section/cover 76.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

REFERENCE NUMERALS

2 Drivetrain
4 Electric machine
6 Double clutch device
8 Input side
10 Drive unit
12 Output side
14 Torsional vibration damper
16 First clutch arrangement
18 Second clutch arrangement
20 First clutch input side
22 First clutch output side
24 First transmission input shaft
26 Transmission
28 Second clutch input side
30 Second clutch output side
32 Second transmission input shaft
34 Odd gears
36 Even gears
38 Output side
40 Freewheel
42 Additional transmission
44 Wheels
46 Input hub
48 Disk carrier
50 Disk carrier
52 Disk carrier
54 Disk carrier
56 Hub
58 Disk pack
60 Disk pack
62 Torque transmission element
64 Traction drive
66 Actuating element
68 Actuating element
70 First actuating force
72 Second actuating force
74 Bearing
76 Housing section/cover
78 Axial bearing
80 Axial bearing
82 Bearing
84 Support element
86 Intermediate element
88 Bearing
90 Module

The invention claimed is:

1. A drivetrain for a hybrid vehicle comprising an electric machine and a double clutch device which has an input side assigned to a drive unit, a first clutch arrangement assigned to a first transmission input shaft of a transmission for selective torque transmission between the drive unit and the first transmission input shaft, and a second clutch arrangement assigned to a second transmission input shaft of the transmission for selective torque transmission between the drive unit and the second transmission input shaft, wherein the first clutch arrangement has a first clutch input side which interacts with the electric machine, and the second clutch arrangement has a second clutch input side, wherein the first clutch input side of the first clutch arrangement is connected to the input side of the double clutch device via a freewheel or to the second clutch input side of the second clutch arrangement.

2. The drivetrain as set forth in claim 1, wherein the first or second transmission input shaft is assigned to the odd gears of the transmission, while the second or first transmission input shaft is assigned to the even gears of the transmission.

3. The drivetrain as set forth in claim 2, wherein the first or second transmission input shaft assigned to the odd gears is also assigned to the reverse gear.

4. The drivetrain as set forth in claim 2, wherein the first or second transmission input shaft assigned to the even gears is also assigned to the reverse gear.

5. The drivetrain as set forth in claim 1, wherein the first and second clutch arrangements are arranged concentrically or radially nested or are arranged in parallel or axially staggered.

6. The drivetrain as set forth in claim 1, wherein the electric machine is arranged radially nested with the first and/or second clutch arrangement.

7. The drivetrain as set forth in claim 1, wherein the electric machine is arranged axially staggered to the first and/or second clutch arrangement, wherein the electric machine is arranged preferably between the first and second clutch arrangement in the axial direction.

8. The drivetrain as set forth in claim 1, wherein a torsional vibration damper is provided between the input side of the double clutch device and an output side of the drive unit.

9. The drivetrain as set forth in claim 1, wherein the drive unit is an internal combustion engine.

10. The drivetrain as set forth in claim 1, wherein the second clutch input side is in rotational driving connection with the input side of the double clutch device, continuously and/or in both of the two opposing rotational directions of the input side of the double clutch device, wherein preferably no freewheel is provided between the second clutch input side and the input side of the double clutch device.

11. The drivetrain as set forth in claim 1, wherein a first actuating force exerted or exertable on the first clutch arrangement and a second actuating force exerted or exertable on the second clutch arrangement are supported or are supportable on a fixed housing, preferably in the axial direction, via a common bearing of the double clutch device.

12. The drivetrain as set forth in claim 11, wherein the first and second actuating forces are particularly preferably set opposite to one another and/or the first and second clutch arrangements are hydraulically actuatable.

13. The drivetrain as set forth in claim 1, wherein the double clutch device, together with the input side, the first clutch arrangement, the first clutch input side, the second clutch arrangement and the second clutch output side, and the freewheel form a module which is coherently connected or is connectable, preferably coherently secured against loss, particularly preferably pluggably connected or is pluggably connectable in the axial direction, to the electric machine and to the transmission.

14. The drivetrain as set forth in claim 13, wherein the module has a housing section or housing cover and a bearing arranged between the input side of the double clutch device and the housing section or cover.

\* \* \* \* \*